(12) United States Patent
Vincon et al.

(10) Patent No.: US 11,525,505 B2
(45) Date of Patent: Dec. 13, 2022

(54) ELECTRIC AXLE DRIVE FOR A COMMERCIAL VEHICLE

(71) Applicant: DAIMLER AG, Stuttgart (DE)

(72) Inventors: Florian Vincon, Stuttgart (DE); Guenter Niebauer, Hochdorf (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 13 days.

(21) Appl. No.: 17/299,880

(22) PCT Filed: Nov. 26, 2019

(86) PCT No.: PCT/EP2019/082497
§ 371 (c)(1),
(2) Date: Jun. 4, 2021

(87) PCT Pub. No.: WO2020/114827
PCT Pub. Date: Jun. 11, 2020

(65) Prior Publication Data
US 2022/0082166 A1    Mar. 17, 2022

(30) Foreign Application Priority Data
Dec. 5, 2018  (DE) .................... 10 2018 009 582.8

(51) Int. Cl.
*B60K 1/00*    (2006.01)
*F16H 57/04*    (2010.01)
(Continued)

(52) U.S. Cl.
CPC .......... *F16H 57/0423* (2013.01); *B60K 1/00* (2013.01); *B60K 1/02* (2013.01); *B60K 17/165* (2013.01);
(Continued)

(58) Field of Classification Search
None
See application file for complete search history.

(56) References Cited

U.S. PATENT DOCUMENTS 7,990,004 B2    8/2011  Aikawa et al.
9,130,412 B2 *  9/2015  Tamura .................. B60K 17/16
(Continued)

FOREIGN PATENT DOCUMENTS

CN    201877944 U  *  6/2011
CN    201881893 U  *  6/2011
(Continued)

OTHER PUBLICATIONS

International Search Report dated Mar. 16, 2020 in related/corresponding International Application No. PCT/EP2019/082497.
(Continued)

*Primary Examiner* — Dirk Wright
(74) *Attorney, Agent, or Firm* — Patent Portfolio Builders PLLC

(57) ABSTRACT

An electric axle drive for a motor vehicle includes at least one electric motor, a differential transmission drivable by the electric motor, a first housing part that at least partially surrounds the differential transmission, a second housing part formed separately from the first housing part and at least partially surrounding the electric motor, and a third housing part formed separately from the first and second housing parts. The first and second housing parts are directly connected to each other by a first flange connection. The second and third housing parts are directly connected to each other by a third flange connection. The third housing part is designed to at least partially support a sub-transmission for connecting the differential transmission to the electric motor. The first and third housing parts are directly connected to each other by a second flange connection.

15 Claims, 4 Drawing Sheets

Figure 1:
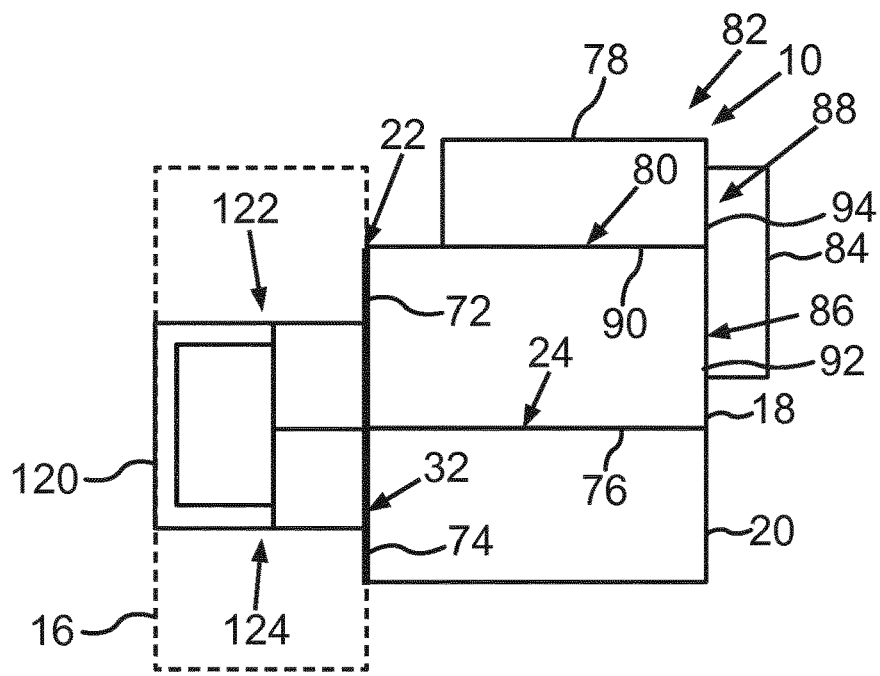

(51) Int. Cl.
*B60K 1/02* (2006.01)
*B60K 17/16* (2006.01)
*F16H 57/021* (2012.01)
*F16H 57/02* (2012.01)

(52) U.S. Cl.
CPC ....... *F16H 57/021* (2013.01); *F16H 57/0471* (2013.01); *F16H 57/0483* (2013.01); *F16H 57/0495* (2013.01); *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 9,719,584 B1 * | 8/2017 | Duan | F16H 37/0813 |
| 9,783,035 B1 | 10/2017 | Huang et al. | |
| 10,189,351 B2 * | 1/2019 | Liu | B60G 5/053 |
| 2012/0153718 A1 | 6/2012 | Rawlinson et al. | |
| 2016/0250916 A1 | 9/2016 | Hirano et al. | |
| 2018/0180162 A1 * | 6/2018 | Hakuta | B60K 17/165 |

FOREIGN PATENT DOCUMENTS

| | | | | |
|---|---|---|---|---|
| CN | 103496320 A | | 1/2014 | |
| CN | 103496320 A | * | 1/2014 | |
| CN | 105691177 A | * | 6/2016 | |
| CN | 105691177 A | | 6/2016 | |
| DE | 112014005133 T5 | * | 8/2016 | ............ B60K 17/04 |
| DE | 112014005133 T5 | | 8/2016 | |
| EP | 0791495 A2 | | 8/1997 | |
| EP | 0791495 A2 | * | 8/1997 | |
| EP | 0982155 A2 | * | 3/2000 | |
| EP | 0982155 B1 | | 5/2004 | |
| EP | 2476932 A1 | * | 7/2012 | ........... B60K 17/356 |
| EP | 2476932 A1 | | 7/2012 | |
| JP | 2967103 B2 | * | 10/1999 | .............. B60K 6/24 |
| WO | 2017114423 A1 | | 7/2017 | |
| WO | WO-2017114423 A1 | * | 7/2017 | ........... B60B 35/124 |

OTHER PUBLICATIONS

Office Action created on Nov. 13, 2019 in related/corresponding DE Application No. 10 2018 000 582.8.

Written Opinion dated Mar. 16, 2020 in related/corresponding International Application No. PCT/EP2019/082497.

* cited by examiner

ELECTRIC AXLE DRIVE FOR A COMMERCIAL VEHICLE

BACKGROUND AND SUMMARY OF THE INVENTION

Exemplary embodiments of the invention relate to an electric axle drive for a motor vehicle.

Such electric axle drives for motor vehicles are already known from WO 2017/114423 A1, DE 11 2014 005 133 T5 and US 2012/0153718 A1. The electric axle drive of US 2012/0153718 A1 has at least one electric motor and a differential transmission, which can be driven by the electric motor. The electric axle drive further comprises a first housing part, which at least partially surrounds the differential transmission. In addition, the electric axle drive comprises a second housing part, which is formed separately from the first housing part and at least partially surrounds the electric motor. Furthermore, the electric axle drive comprises a third housing part formed separately from the first housing part and separately from the second housing part. The first housing part and the second housing part are thus directly connected to each other by means of a first flange connection. Furthermore, the second housing part and the third housing part are directly connected to each other by means of a third flange connection.

Furthermore, the generic CN 103 496 320 A shows an electric axle drive with the third housing part designed to at least partially support a sub-transmission for connecting the differential transmission to the electric motor, wherein the first housing part and the third housing part are directly connected to each other by means of a second flange connection.

Furthermore, EP 0 982 155 B1 discloses a device for an axle housing, wherein the device comprises the axle housing having a differential housing as a component thereof.

Exemplary embodiments of the present invention are directed to an electric axle drive and a motor vehicle of the aforementioned type that a particularly compact design of the electric axle drive can be implemented.

In order to further develop an electric axle drive in such a way that a particularly compact design of the electric axle drive can be implemented, it is first assumed in a known manner that the third housing part is designed to at least partially support a sub-transmission for connecting the differential transmission to the electric motor. For this purpose, the third housing part has, for example, at least one bearing device on which the sub-transmission is to be or is at least partially mounted. By way of example, the sub-transmission can be a component of the electric axle drive, such that the electric axle drive has the sub-transmission. Thus, for example, at least part of the sub-transmission is mounted on the third housing part, in particular via the bearing device.

According to the invention, the electric axle drive has a bearing bracket for mounting the differential transmission, wherein the bearing bracket is arranged at least predominantly in the first housing part and is held by means of a first holding device on the second housing part and by means of a second holding device on the third housing part.

The feature that the sub-transmission is designed to connect the differential transmission to the electric motor is understood, in particular, to mean that the differential transmission can be or is coupled to the electric motor via the sub-transmission. The sub-transmission preferably has a transmission that differs from 1 and is also referred to as a transmission ratio, such that, for example, the sub-transmission speeds up or slows down the electric motor, in particular its rotor.

Furthermore, in accordance with the invention the first housing part and the third housing part are directly connected to each other by means of a second flange connection. In this way, it is possible to keep the installation space requirement and thus, in particular, outer dimensions of the electric axle drive particularly low, such that, for example, existing installation space can be utilized particularly well. The feature that the first housing part and the second housing part are directly connected to each other by means of the first flange connection is to be understood to mean that the first housing part and the second housing part are not connected to each other with the interposition of a further housing part, but rather the first housing part and the second housing part are directly connected to each other by means of the first flange connection. In particular, it can be provided that the first housing part is directly supported on the second housing part and thus touches the second housing part. It is conceivable that at least one first sealing element is arranged between the first housing part and the second housing part, by means of which the first housing part is sealed against the second housing part and vice versa. In particular, the first flange connection can comprise a first flange of the first housing part and a second flange of the second housing part, wherein the first housing part and the second housing part are directly connected to each other via the first flange and the second flange. By way of example, the first flange and the second flange are directly supported against each other and thereby are in direct mutual contact with each other. The first sealing element can be arranged between the first flange and the second flange in order to seal the first flange from the second flange, and thus to seal the first housing part against the second housing part.

The feature that the second housing part and the third housing part are directly connected to each other by means of the third flange connection is to be understood to mean that the second housing part and the third housing part are not connected to each other via a further housing part, but rather the second housing part and the third housing part are directly connected to each other. In particular, it can be provided that the second housing part is in direct contact with the third housing part or that the second housing part is directly supported on the third housing part. In this way, the third flange connection can comprise a third flange of the second housing part and a fourth flange of the third housing part, wherein the second housing part and the third housing part are directly connected to each other via the third flange and the fourth flange. Furthermore, it is conceivable that at least one second sealing element is arranged between the second housing part and the third housing part, in particular between the third flange and the fourth flange, by means of which the second housing part is sealed against the third housing part or vice versa.

The feature that the first housing part and the third housing part are directly connected to each other by means of the second flange connection is to be understood to mean that the first housing part is not connected to the third housing part via a further housing part, but rather the first housing part and the third housing part are directly connected to each other by means of the second flange connection. In particular, it can be provided that the first housing part is directly supported on the third housing part and is thus in direct contact with the third housing part. The second flange connection can comprise a fifth flange of the first housing part and a sixth flange of the third housing part, wherein the first housing part and the third housing part are directly connected to each other via the fifth flange and the sixth flange. It is thus conceivable that at least a third sealing element is arranged between the first housing part and the third housing part, in particular between the fifth flange and the sixth flange, by means of which the first housing part is sealed off from the third housing part or vice versa.

The feature that the first housing part at least partially surrounds the differential transmission is to be understood to mean that the differential transmission is arranged at least partially, in particular predominantly or completely, in the first housing part. The feature that the second housing part partially surrounds the electric motor is to be understood in particular to mean that the electric motor is arranged at least partially, in particular at least predominantly or completely, in the second housing part. As a result of the fact that the housing parts are formed separately from one another and are connected to one another and are thus held to one another, the electric axle drive can be manufactured or assembled in a particularly simple manner and thus in a time-saving and cost-effective manner. In particular, complexity of the individual housing parts can be kept low, with increased functional integration compared to conventional solutions.

The first housing part is, for example, an axle bridge. Due to the design of the housing parts, a conventional axle bridge can be used as the first housing part, such that the electric axle drive according to the invention can be implemented simply and inexpensively. Furthermore, it is possible to easily integrate the electric axle drive according to the invention into already existing axle bridges and thus into already existing production processes.

In an advantageous embodiment of the invention, the third housing part has at least one first bearing point for supporting a first shaft of the sub-transmission. In other words, the sub-transmission comprises the first shaft, which is mounted, in particular rotatably, on the first bearing point and thus on the third housing part. This makes it possible to create a particularly high level of functional integration, such that the installation space requirement and the number of parts can be kept within a low range.

In a further embodiment the third housing part has at least one third bearing point for mounting the sub-transmission. This means that the sub-transmission is mounted on the third bearing point and thus on the third housing part, whereby the installation space requirement of the electric axle drive can be kept within a particularly low range.

In a further particularly advantageous embodiment of the invention, the first flange connection has a first flange plane. In the first flange plane, the first flange and the second flange are supported at least indirectly and thus via the first sealing element and/or directly against each other. It is provided that the first flange plane, in particular in the installation position of the electric axle drive, extends in a plane spanned by the vehicle transverse direction and the vehicle transverse direction. Thus, for example, the first flange plane runs at least substantially perpendicularly to the vehicle longitudinal direction. The electric axle drive assumes its installation position in the fully manufactured state of the motor vehicle, which is designed, for example, as a commercial vehicle, such that the vehicle comprises the electric axle drive according to the invention in its fully manufactured state. This orientation of the first flange plane can ensure a particularly simple assembly and a particularly small installation space requirement of the electric axle drive.

In a further embodiment of the invention, the second flange connection has a second flange plane. In the second flange plane, for example, the fifth flange and the sixth flange are supported at least indirectly and thus, for example, via the third sealing element and/or directly against one another. In order to be able to keep the installation space requirement and the complexity of the electric axle drive particularly low, it is provided in accordance with the invention that the second flange plane is congruent with the first flange plane. This means that the first flange plane coincides with the second flange plane, or vice versa.

In order to be able to keep the complexity and the installation space requirement of the electric axle drive particularly low, it is provided in a further embodiment of the invention that the third flange connection has a third flange plane running in a plane spanned by the vehicle longitudinal direction and the vehicle vertical direction, in particular with respect to the installation position of the electric axle drive. By way of example, the third flange and the fourth flange are supported in the third flange plane at least indirectly and thereby, for example, via the second sealing element and/or directly against one another. Thus, for example, the third flange plane runs at least substantially perpendicularly to the vehicle longitudinal direction. Alternatively, or additionally, the second flange plane preferably runs at least substantially perpendicularly to the vehicle longitudinal direction.

In a further embodiment of the invention, the electric axle drive comprises a fourth housing part formed separately from the first housing part, separately from the second housing part and separately from the third housing part. The fourth housing part is connected to the second housing part, in particular directly, by means of a fourth flange connection. The fourth flange connection comprises, for example, a seventh flange of the fourth flange housing part and an eighth flange of the second housing part, wherein the fourth housing part is directly connected to the second housing part via the seventh flange and the eighth flange. It is thus conceivable that the second housing part is in direct contact with the fourth housing part or that the second housing part is directly supported on the fourth housing part, such that, for example, the seventh flange and the eighth flange are in immediate or direct contact with each other. In other words, the seventh flange can be directly supported on the eighth flange. Furthermore, it is conceivable that at least one fourth sealing element is arranged between the second housing part and the fourth housing part, in particular between the seventh flange and the eighth flange, by means of which the second housing part is sealed against the fourth housing part or vice versa.

In order to keep the installation space requirement within a particularly small framework, the fourth housing part and thus the fourth flange connection are arranged on a side of the second housing part facing away from the third housing part. The fourth housing part is designed to cover an access opening for the electric motor formed in the second housing part. In other words, for example, the second housing part has the access opening, in particular formed as a through opening, via which the electric motor is accessible. By way of example, the electric motor can be arranged and/or maintained or repaired via the access opening in the second housing part, in particular while the electric motor is located in the second housing part. In this case, the access opening is preferably covered, in particular closed, by means of the fourth housing part.

It has been shown to be particularly advantageous if the electric axle drive has a fifth housing part formed separately from the first housing part, separately from the second housing part and separately from the third housing part and preferably separately from the fourth housing part, which is connected by means of a fifth flange connection to the second housing part and by means of a sixth flange connection to the fourth housing part, in particular directly in each case.

By way of example, as previously stated with respect to the first housing part, the second housing part, and the third housing part, the feature that the second housing part is directly connected to the fourth housing part is to be understood to mean that the second housing part is not connected to the fourth housing part via a further housing part, for example, but rather that the second housing part and the fourth housing part are directly connected to each other. Accordingly, the feature that the fifth housing part is directly connected to the second housing part can be understood to mean that the fifth housing part is not approximately connected to the second housing part via another housing part, but rather the fifth housing part is directly connected to the second housing part. Furthermore, the feature that the fifth housing part is directly connected to the fourth housing part can be understood to mean that the fifth housing part is not connected to the fourth housing part via another housing part, for example, but the fifth housing part is directly connected to fourth housing part. By way of example, the fifth housing part is in direct contact with the second housing part and/or the fourth housing part, or the fifth housing part is directly supported on the second housing part and/or the fourth housing part, for example.

The fifth flange connection comprises, for example, a ninth flange of the fifth housing member and a tenth flange of the second housing member, wherein the ninth flange and the tenth flange can be directly supported against each other. The fifth housing part is connected to the second housing part via the ninth flange and the tenth flange. In particular, at least one fifth sealing element can be arranged between the fifth housing part and the second housing part, in particular between the ninth flange and the tenth flange, such that by means of the fifth sealing element, the fifth housing part is sealed against the second housing part or vice versa.

Furthermore, the sixth flange connection can have an eleventh flange of the fifth housing part and a twelfth flange of the fourth housing part, wherein the fifth housing part is connected to the fourth housing part via the eleventh flange and the twelfth flange. In this regard, the eleventh flange can be directly supported against the twelfth flange, wherein the eleventh flange can be in direct contact with the twelfth flange. Furthermore, it is conceivable that a sixth sealing element is arranged between the fifth housing part and the fourth housing part, in particular between the eleventh flange and the twelfth flange, such that by means of the sixth sealing element, the fifth housing part is sealed against the fourth housing part or vice versa.

Furthermore, it is provided that the fifth housing part has a holder for at least one high-voltage connection. The holder is also referred to as a high-voltage connection holder. In particular, it is conceivable that the high-voltage connection is a component of the electric axle drive, wherein the high-voltage connection, which is formed separately from the housing parts, for example, is held on the fifth housing part by means of the holder. Via the high-voltage connection, for example, the electric motor can be or is electrically connected to an energy storage device designed to store electrical energy or electrical current. The electric motor is thereby preferably a first high-voltage component, which has an electrical voltage, in particular an electrical operating voltage, which is preferably greater than 50 volts, in particular greater than 60 volts, and is particularly preferably several hundred volts. As a result, particularly large electrical powers for electrically driving the motor vehicle can be implemented. The aforementioned energy storage device is preferably a second high-voltage component, wherein the energy storage device can be a component of the electric axle drive. Since the energy storage device is a high-voltage component, the energy storage device has an electrical voltage, in particular an electrical operating voltage, which is preferably greater than 50 volts, in particular greater than 60 volts, and is particularly preferably several hundred volts. In this way, the electric motor can be supplied with electrical energy via the high-voltage connection, which is stored in the energy storage device and can be or is provided by the energy storage device. The fact that the fifth housing part has the holder for the high-voltage connection means that a particularly high level of functional integration can be implemented, such that the number of parts, the weight, the costs, and the installation space requirements can be kept particularly low.

In order to be able to keep the complexity and the installation space requirements of the electric axle drive particularly low, it is provided in a further embodiment of the invention that the fifth flange connection and the sixth flange connection have a fourth flange plane common to the fifth flange connection and the sixth flange connection. By way of example, the ninth flange and the tenth flange are supported against each other in the fourth flange plane, and the eleventh flange and the twelfth flange are supported against each other in the fourth flange plane. The ninth flange and the tenth flange or the eleventh flange and the twelfth flange can be supported on each other in the fourth flange plane directly and/or at least indirectly, for example via the fifth or sixth sealing element.

In a particularly advantageous embodiment of the invention, the electric axle drive comprises an oil distribution device by means of which, for example, a lubricant, in particular in the form of oil, can be distributed for lubricating the electric axle drive. The oil distribution device comprises at least one first oil connection, at least one second oil connection, at least one first oil line and at least one second oil line. This allows the lubricant to be distributed as required in a way that is favorable in terms of installation space.

It has proved particularly advantageous if the first oil connection is connected to the second housing part by means of the first oil line, as a result of which the second housing part can be supplied with lubricant via the first oil line and the first oil connection in a manner favorable to the installation space. Furthermore, it is preferably provided that the second oil connection is connected to the fourth housing part by means of the second oil line, such that the fourth housing part can be supplied with lubricant via the second oil line and the second oil connection in a manner favorable to the installation space.

In another embodiment the fact that the first oil connection is connected to the first housing part by means of the first oil line, such that the first housing part can be supplied with lubricant via the first oil line and the first oil connection as required and, in a manner, favorable to the installation space. Furthermore, it is thereby preferably provided that first the second oil connection is connected to the third housing part by means of the second oil line, whereby the third housing part can be supplied with lubricant via the second oil line and the second oil connection as required and, in a manner, favorable to installation space.

In a further embodiment of the invention, the second housing part has a second bearing point for supporting a spur gear stage. Preferably, the spur gear stage is a component of the electric axle drive. In particular, the spur gear stage is a component of the partial transmission, wherein the spur gear stage can be mounted, in particular rotatably, on the second bearing point and thus on the second housing part via the second bearing point. This allows a mounting of the spur gear stage and thus of the sub-transmission in a manner that is particularly favorable to installation space. The spur gear stage comprises, for example, at least or exactly two gear wheels designed as spur gears, which mesh with one another via their respective toothings.

In a further advantageous embodiment of the invention, the first flange connection forms a first ring section and the second flange connection forms a second ring section, wherein the ring sections forms a closed flange ring. In this way, a particularly high degree of rigidity can be implemented in a space-saving manner.

It has proved particularly advantageous if the third flange connection forms a third ring section, which has a first section end and a second section end, wherein both the first section end and the second section end are connected to the closed flange ring. Again, this can ensure high rigidity and low installation space requirements for the electric axle drive.

As previously indicated, the electric motor has the rotor and a stator, wherein the rotor can be driven by the stator and thereby around a motor axis of rotation relative to the stator. The differential transmission has output wheels, which are rotatable around a differential transmission axis of rotation relative to the first housing part. Via the output wheels, which are preferably formed as gear wheels, so-called output shafts or side shafts can be driven, for example, wherein respective wheels can be driven by the respective output shafts or side shafts, for example. Thus, the wheels can be driven by the output wheels via the side or output shafts.

The differential transmission can have differential gears, which are further gear wheels. The differential gears mesh with the output gears, for example. The differential gears are rotatably mounted, for example, on a differential cage or differential housing of the differential transmission, wherein the differential housing or the differential cage, for example, is rotatable together with the differential gears around the differential transmission axis of rotation relative to the first housing part. For this purpose, the differential cage or differential housing is non-rotatably connected, for example, to a drive wheel designed, for example, as a crown wheel, wherein the drive wheel is rotatable around the differential transmission rotation axis relative to the first housing part. In order to keep the installation space requirement particularly low, the motor axis of rotation runs in parallel to the differential transmission axis of rotation or vice versa.

Furthermore, it has proved to be particularly advantageous if the second housing part has at least one first receptacle for the electric motor. Thus, for example, the electric motor is held or mounted on the second housing part via the first receptacle, wherein it is possible for the electric motor to be accommodated in the first receptacle at least partially, in particular at least predominantly or completely. It is preferably provided that the second housing part has at least one second receptacle for a second electric motor. The electric axle drive can thus have, for example, a second electric motor that is held or mounted on the second housing part via the second receptacle. Thus, the second electric motor can be accommodated at least partially, in particular at least predominantly or completely, in the second receptacle. By means of the second electric motor, for example, the differential transmission can be driven, in particular via the sub-transmission. Thus, for example, the aforementioned output shaft and thus the wheels of the motor vehicle can be driven by the electric motor or motors, in particular electrically, via the differential transmission and via the sub-transmission.

The electric axle drive advantageously has two oil chambers, namely a first oil chamber, which is arranged predominantly in the first housing part, and a second oil chamber, which is sealed with respect to the first oil chamber, wherein the second oil chamber is arranged at least partially in each of the second housing part, the third housing part and the fourth housing part, and wherein a first gear wheel, a second gear wheel and the first shaft are supplied with oil in the second oil chamber.

The differential transmission, which is designed, for example, as a ball differential, bevel gear differential, or a spur gear differential, has a function that is already sufficiently known from the general prior art, according to which torques provided by the respective electric motor for driving the wheels are transmitted or distributed to the wheels or to the side shafts via the differential transmission. The differential transmission allows different speeds of the side shafts or wheels, such that, for example, when the vehicle is cornering, the outer wheel can rotate at a higher speed than the inner wheel, in particular while the wheels are being driven by the respective electric motor.

In the context of the invention, the ordinal number words used in the present description and also referred to as ordinals, such as "first", "second", "third", "fourth", "fifth", "sixth" et cetera—unless otherwise indicated—are not to be understood as ordinal number words per se indicating an order or a number, but the ordinal number words used in the description are—unless otherwise indicated—rather to be regarded as adjectives, in order to be able to unambiguously distinguish the terms assigned to the respective ordinal words, such as "housing part", "flange connection", "flange plane" et cetera from each other, and thus to be able to refer unambiguously to these terms assigned to the ordinal number words. This means that, for example, if the features of a dependent claim, such as the third bearing position, are included in an independent claim 1, such that the combination of claim features then only speaks of the third bearing position, but not also of the first bearing position and of the second bearing position, the first bearing position and the second bearing position do not necessarily also have to be provided. Then, for example, the first bearing position and the second bearing position could remain in their respective claims, wherein the third bearing position then contained in the combined claim, for example, becoming the first bearing position, the first bearing position becoming the second bearing position, and the second bearing position becoming the third bearing position. The ordinal number words used in the description are, for example, irrelevant for the respective technical function of the respective assigned terms and for the number thereof in principle and if nothing else is indicated, wherein the respective terms assigned to the respective ordinal number words are defined with respect to their respective technical functions not by the respective assigned ordinal number words, but rather by formulations following the terms and/or by the terms themselves.

The invention also includes a motor vehicle, which is preferably designed as an automobile and preferably as a commercial vehicle. The motor vehicle according to the invention has an electric axle drive according to the invention. Thus, the motor vehicle can be driven electrically by means of the electric axle drive. Advantages and advantageous embodiments of the electric axle drive according to the invention are to be regarded as advantages and advantageous embodiments of the motor vehicle according to the invention, and vice versa.

Further advantages, features and details of the invention arise from the following description of a preferred exemplary embodiment and from the drawing. The features and combinations of features mentioned above in the description, as well as the features and combinations of features mentioned below in the description of figures and/or shown alone in the figures, can be used not only in the combination indicated in each case, but also in other combinations or on their own, without departing from the scope of the invention.

BRIEF DESCRIPTION OF THE DRAWING FIGURES

Figure 2:
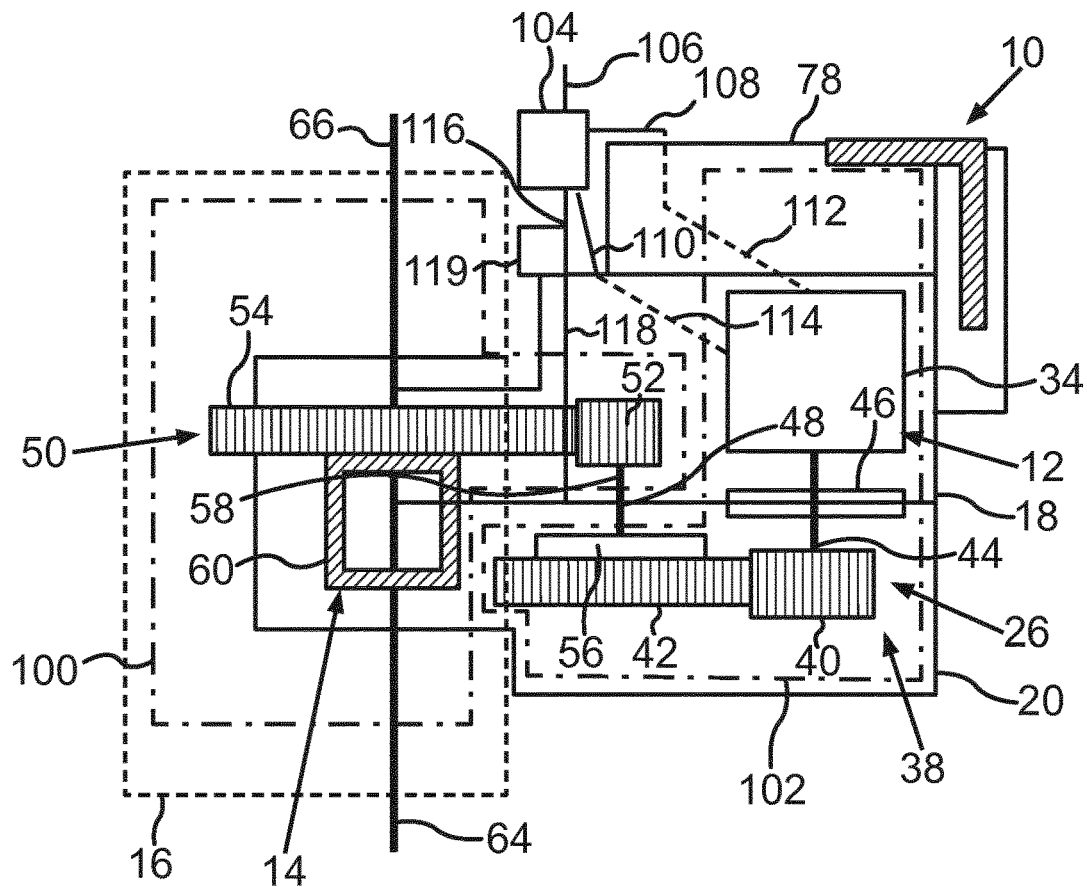
Figure 3:
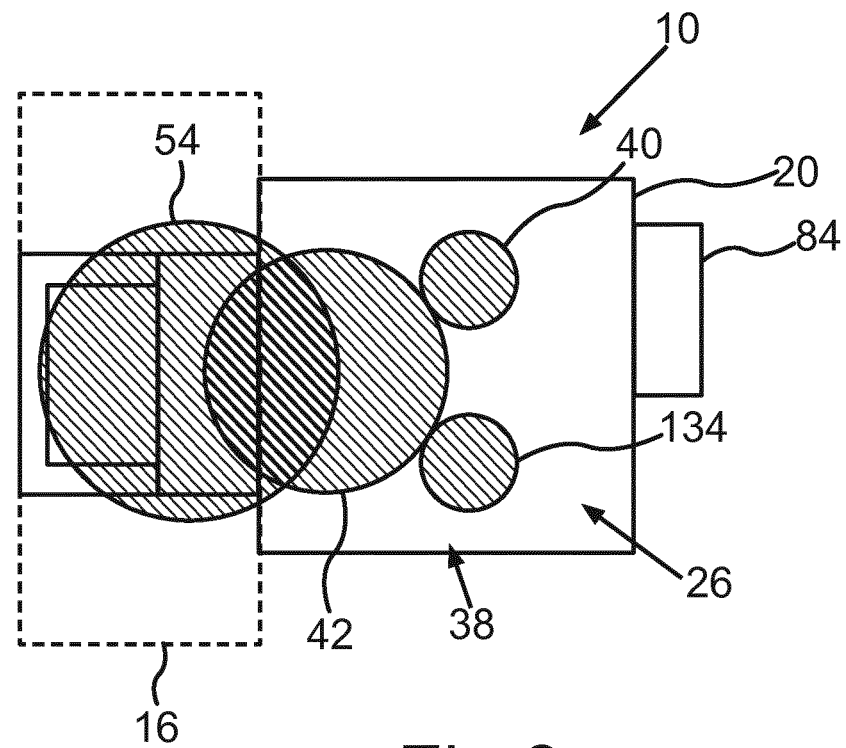
Figure 4:
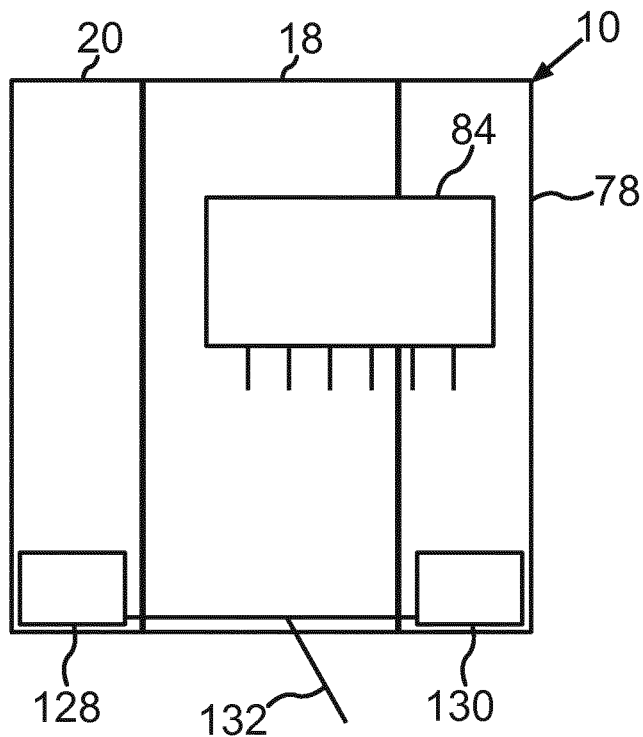
Figure 5:
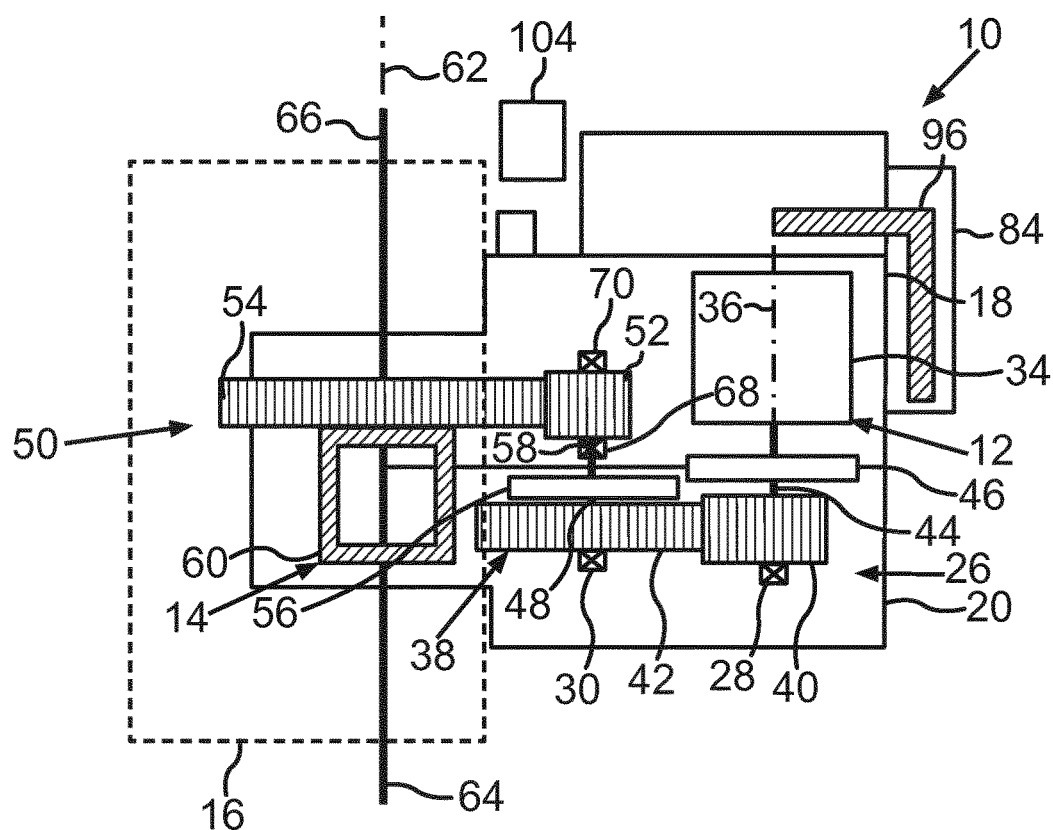
Figure 6:
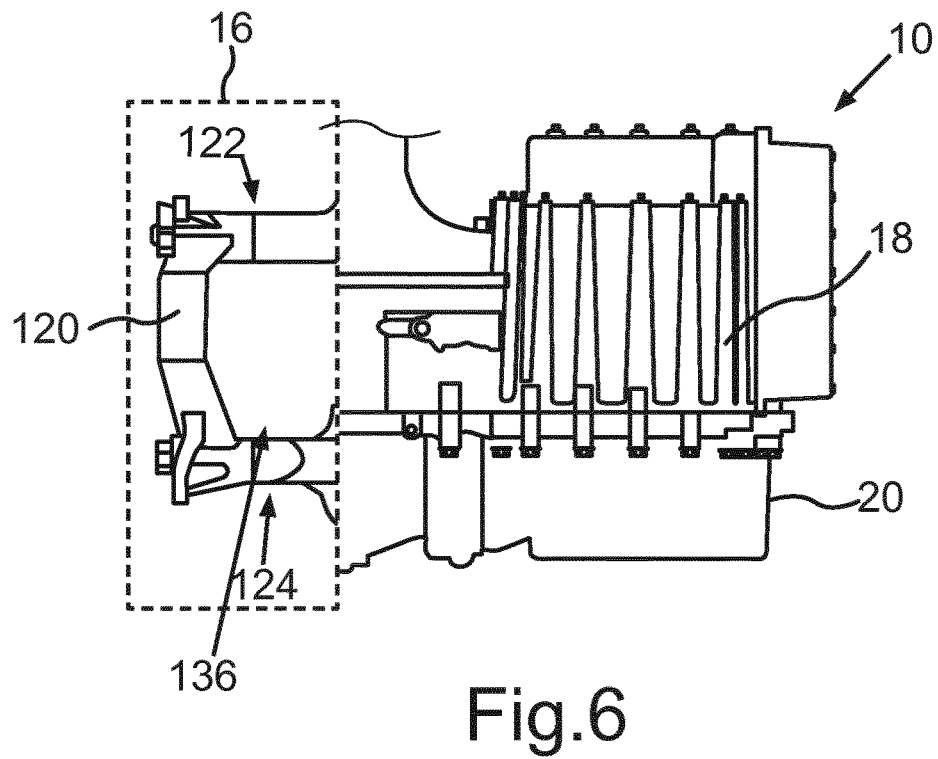

The drawing shows in:

FIG. 1 a schematic top view of an electric axle drive for a motor vehicle according to the invention;

FIG. 2 a schematic and sectional top view of the electric axle drive;

FIG. 3 a schematic side view of the axle drive according to the invention;

FIG. 4 a schematic front view of the axle drive;

FIG. 5 a further schematic and sectional top view of the electric axle drive;

FIG. 6 a further schematic top view of the axle drive; and

Figure 7:
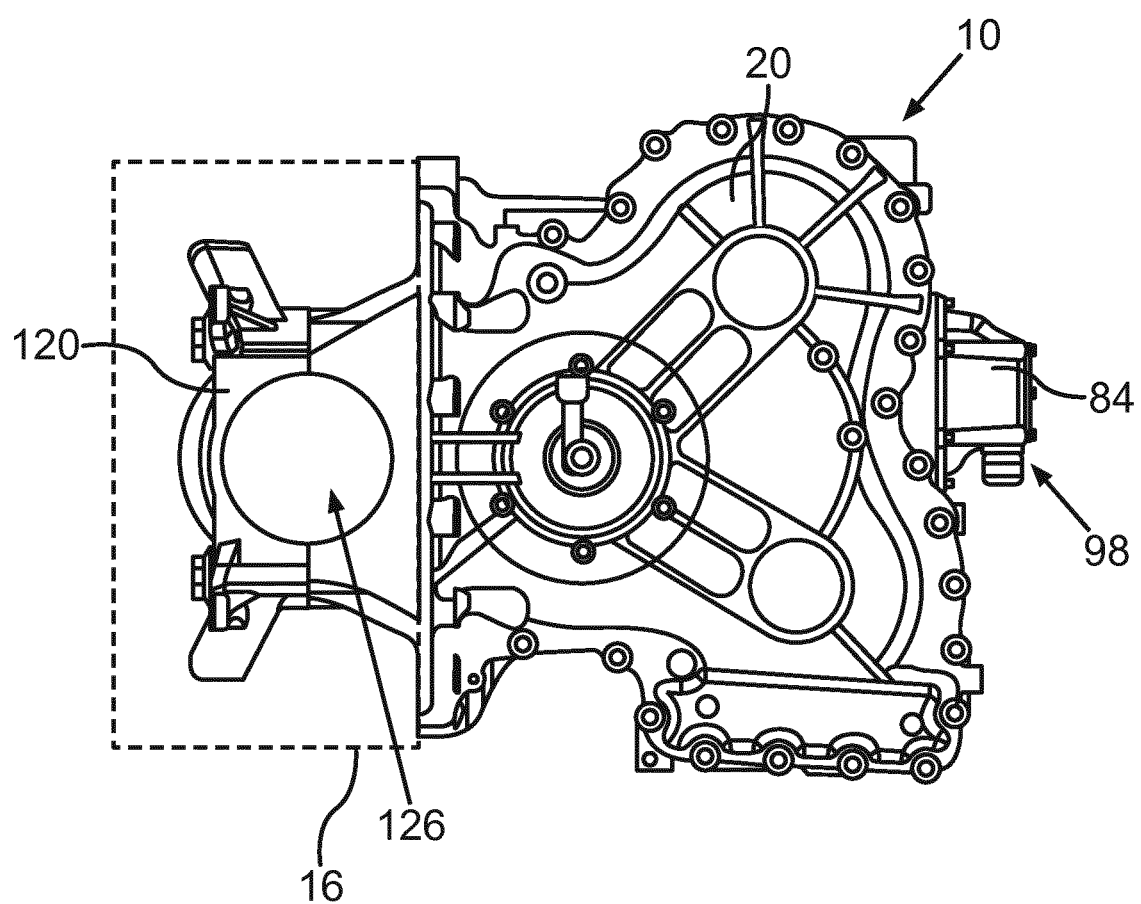

FIG. 7 a further schematic side view of the electric axle drive.

In the figures, identical or functionally identical elements are provided with the same reference numerals.

DETAILED DESCRIPTION

FIG. 1 shows a schematic top view of an electric axle drive 10 for a motor vehicle, in particular for an automobile, such as a commercial vehicle. This means that the motor vehicle in its fully manufactured state comprises the electric axle drive 10. In this context, the electric axle drive 10 is assigned to an axle of the motor vehicle. The axle comprises at least or exactly two wheels spaced apart from each other in the transverse direction of the vehicle, which can be driven by means of the electric axle drive 10. In other words, the wheels and thus the motor vehicle as a whole can be driven by means of the electric axle drive 10, in particular electrically. For this purpose, the electric axle drive 10 has at least one electric motor 12, which can be seen from FIG. 2. The electric motor 12 is an electric machine, which can be operated at least in one engine mode and thus as an electric motor. The wheels can thus be driven electrically by means of the electric motor 12. The electric axle drive 10 further comprises a differential transmission 14, also referred to as an axle gear, which can be driven by the electric motor 12. The aforementioned wheels can be driven via the differential transmission 14, such that the wheels can be driven by the electric motor 12 via the differential gear 14. It can be seen particularly well from FIG. 1 that the electric axle drive 10 has a first housing part 16 shown particularly schematically in FIGS. 1 and 2, which is designed as an axle bridge, for example. In this case, the differential transmission 14 is arranged at least partially, in particular at least predominantly or completely, in the first housing part 16, such that the first housing part 16 at least partially surrounds the differential transmission 14. The electric axle drive 10 further comprises a second housing part 18 formed separately from the first housing part 16, in which the electric motor 12 is arranged at least partially, in particular at least predominantly or completely. Thus, the housing part 18, which is formed separately from the first housing part 16, at least partially surrounds the electric motor 12. The electric axle drive 10 further comprises a third housing part 20, which is formed separately from the first and second housing parts 16 and 18. The first housing part 16 and the second housing part 18 are directly connected to each other by means of a first flange connection 22. In addition, the second housing part 18 and the third housing part 20 are directly connected to each other by means of a third flange connection 24.

In order to now be able to implement a particularly high level of functional integration and thus to represent a particularly compact design of the electric axle drive 10, the electric axle drive 10 comprises a sub-transmission 26, which is arranged at least partially in the third housing part 20. In the exemplary embodiment illustrated in the figures, the sub-transmission 26 is arranged partly in the third housing part 20, partly in the second housing part 18 and partly in the first housing part 16. In this case, the third housing part 20 is designed to support the sub-transmission 26. For this purpose, the third housing part 20 has bearing points, namely a first bearing point 28 and a third bearing point 30, at which or via which the sub-transmission 26 is mounted on the third housing part 20, in particular rotatably. This is to be understood in particular to mean that respective gear elements are rotatably mounted on the first and third bearing points 28 and 30 and thus on the third housing part 20. Furthermore, the first housing part 16 and the third housing part 20 are directly connected to each other by means of a second flange connection 32.

The electric motor 12 has a stator 34 and a rotor, which cannot be seen in the figures, and which can be driven by the stator 34 and is thereby rotatable around a motor axis of rotation 36 relative to the stator 34 and relative to the second housing part 18. In this respect, the rotor is rotatably mounted, for example, by means of at least one rotor bearing. The sub-transmission 26 has a first spur gear stage 38 (FIG. 5), which comprises a first gear wheel 40 and a second gear wheel 42. The first and second gear wheels 40 and 42 are, for example, spur gears and mesh with each other via their respective toothings. The sub-transmission 26 comprises a first shaft 44 drivable, for example, by the rotor and thus the electric motor 12. The first shaft 44 is non-rotatably connected to the first gear wheel 40, which means that the first shaft 44 is arranged coaxially with respect to the first gear wheel 40 and cannot be rotated with respect to the first gear wheel 40. The first shaft 44, and thus the first gear wheel 40, are rotatably mounted on the first bearing point 28, and thus on the third housing part 20. The sub-transmission 26 comprises, for example, a first planetary set 46, via which the first shaft 44 can be driven by the rotor and thus by the electric motor 12.

The sub-transmission 26 also has a second shaft 48, which, for example, is non-rotatably connected to the second gear wheel 42. The second shaft 48, and thus the second gear wheel 42, are rotatably mounted on the third bearing point 30, and thus on the housing 20. In addition, the sub-transmission 26 has, for example, a second spur gear stage 50 which has two further gear wheels, a third gear wheel 52 and a fourth gear wheel 54. The gears 52 and 54 are, for example, spur gears which mesh with each other via their respective toothings. The third gear wheel 52, for example, can be driven by the second shaft 48 and the second gear wheel 42 via a second planetary set 56 of the sub-transmission 25. This means that the sub-transmission 25 comprises the second planetary set 56, via which the third gear wheel 52 can be driven by the second shaft 48 and by the second gear wheel 42. The sub-transmission 26 comprises a third shaft 58, which is non-rotatably connected to the third gear wheel 52.

Furthermore, it can be seen particularly well from FIGS. 2 and 5 that the differential transmission 14 has a differential housing 60, which can be rotated around a differential transmission axis of rotation 62 relative to the first housing part 16 and thus relative to the third housing part 20. The differential housing 60 is formed, for example, as a differential cage. The differential housing 60 can be driven by the fourth gear wheel 54. For this purpose, for example, the fourth gear wheel 54 is non-rotatably connected to the differential transmission differential housing such that, for example, the fourth gear wheel 54 and the differential housing 60 rotate together or simultaneously around the differential transmission axis of rotation 62 relative to the first housing part 16. Thus, the differential transmission 14 can be driven by the electric motor 12 via the sub-transmission 26, such that the wheels can be driven by the electric motor 12 via the differential transmission 14 and via the sub-transmission 26.

The differential transmission differential housing is designed, for example, as a bevel gear transmission or as a spur gear differential. The differential transmission 14, which is also referred to as an axle drive, has, for example, at least or exactly two output gears. The output gears are gear wheels non-rotatably connected to respective side shafts 64 and 66 and designed, for example, as cardan shafts and are also referred to as output shafts. The wheels can thus be driven by the side shafts 64 and 66, such that the wheels can be driven, in particular electrically, by the differential transmission 14 via the side shafts 64 and 66 and by the electric motor 12 via the differential transmission 14.

The differential transmission 14 further comprises differential gears, which are formed as further gear wheels. The differential gears mesh with the output gears, for example. Furthermore, the differential gears are rotatably mounted on the differential housing 60 such that the differential gears can rotate relative to the differential housing 60 around a differential axis. Here, for example, the differential axis runs at least substantially perpendicularly to the differential transmission axis of rotation 62, in particular when the differential transmission 14 is designed as a bevel gear differential. The differential gears and the differential housing 60 can rotate together or simultaneously around the differential transmission axis of rotation 62 relative to the first housing part 16. It can be seen particularly well from FIG. 5 that the differential transmission axis of rotation 62 runs at least substantially in parallel to the motor axis of rotation 36, or vice versa.

Overall, it can be seen from FIG. 5 that the third housing part 20 has at least the bearing points 28 and 30 for mounting the sub-transmission 26. Furthermore, the housing part 18 has a second bearing point 68 at which, for example, the third shaft 58 and thus the third gear wheel 52 are rotatably mounted. Thus, the third shaft 58 and thus the third gear wheel 52 are rotatably mounted at the second bearing point 68 and thus on the second housing part 18. Furthermore, the second housing part 18 has a fourth bearing point 70, wherein the third shaft 58 and thus the third gear wheel 52 are rotatably mounted at the fourth bearing point 70 and thus on the second housing part 18.

It can be seen particularly well from FIG. 1 that the first flange connection 22 has a first flange plane 72, which runs in a plane spanned by the differential housing 60 and the vehicle vertical direction of the motor vehicle, in particular in the installation position of the electric axle drive 10. Here, the electric axle drive 10 assumes its installation position in the completely manufactured state of the motor vehicle.

Furthermore, the second flange connection 32 has a second flange plane 74, which also runs in a plane spanned by the vehicle transverse direction and the vehicle vertical direction. In the present case, the first flange plane 72 and the second flange plane 74 coincide, such that the first and second flange planes 72 and 74 are congruent. The third flange connection 24 has a third flange plane 76, which runs perpendicular to the first and second flange planes 72 and 74, for example. Thus, for example, the third flange plane 76 runs in a plane spanned by the vehicle vertical direction and the vehicle longitudinal direction.

The electric axle drive 10 further comprises a fourth housing part 78 formed separately from the first, second, and third housing parts 16, 18, and 20. In the fourth housing part 78, for example, power electronics are at least partially, in particular at least predominantly or completely, accommodated. The axle drive 10 or the motor vehicle, in particular in its fully manufactured state, can have an energy storage device designed to store electrical energy or electrical current. The electric motor 12 is supplied with electrical energy stored in the energy storage device in order to drive the motor vehicle electrically by means of the electric motor 12. The electric motor 12 can be supplied with electrical energy stored in the energy storage device via the power electronics. For this purpose, for example, the electric motor 12 or the power electronics are electrically connected or connectable to the energy storage device.

The fourth housing part 78 is directly connected to the second housing part 18 by means of a fourth flange connection 80, wherein the fourth housing part 78 and the fourth flange connection 80 are arranged on a side 82 of the second housing part 18 facing away from the third housing part 20 and the third flange connection 24, in particular in the transverse direction of the vehicle. Alternatively, or additionally, it is provided that the fourth housing part 78 is designed to cover or overlap an access opening for the electric motor 12 formed in the second housing part 18. In other words, for example, the second housing part 18 has the access opening, for example formed as a through opening, through which the electric motor 12 is accessible. Here, the access opening is covered by the fourth housing part 78 and thus closed. Since the fourth housing part 78 closes the access opening, the fourth housing part 78 is also referred to as a motor cover, for example. Since, for example, the high-voltage connection 98 is held on the fifth housing part 84, the fifth housing part 84 is also referred to, for example, as a high-voltage connection box.

The axle drive 10 further comprises the fifth housing part 84 formed separately from the first housing part 16, separately from the second housing part 18, separately from the third housing part 20, and separately from the fourth housing part 87. It is thus conceivable that the power electronics described above are arranged at least partially, in particular at least predominantly or completely, in the fifth housing part 84. The fifth housing part 84 is directly connected to the second housing part 18 by means of a fifth flange connection 86 and directly connected to the fourth housing part 78 by means of a sixth flange connection 88.

The fourth flange connection 80 has a fourth flange plane 90 which runs at least substantially in parallel to the third flange plane 76. Thus, for example, the fourth flange plane 90 extends in a plane spanned by the vehicle vertical direction and vehicle longitudinal direction. The fifth flange connection 86 has a fifth flange plane 92, and the sixth flange connection 88 has a sixth flange plane 94. The fifth flange plane 92 and the sixth flange plane 94 coincide, such that, for example, the fifth flange connection 86 and the sixth flange connection 88 have a fourth flange plane common to the fifth flange connection 86 and the sixth flange connection 88. By way of example, the fifth and sixth flange planes 92 and 94 run in this fourth flange plane 90.

It can be seen particularly well in combination with FIG. 7 that the fifth housing part 84 has a holder 96 for a high-voltage connection 98. Thus, the high-voltage connection 98 is held on the housing part 84 by means of the holder 96. The electric motor 12 is electrically connected to the energy storage device via the high-voltage connection 98, in particular via the power electronics, such that, for example, the power electronics are electrically connected to the energy storage device via the high-voltage connection 98. Thus, it can be provided that the electric motor 12 is electrically connected to the energy storage device via the power electronics and the high-voltage connection 98. Preferably, the high-voltage connection 98 is a component of the electric axle drive 10.

FIG. 2 shows a supply of lubricant, in particular oil, to the axle drive 10. In FIG. 2, a first oil chamber is designated 100, which is formed or delimited, for example at least partially, in particular at least predominantly or completely, by the first and second housing parts 16 and 18. Thus, the first oil chamber 100 is arranged, for example, partially in the first housing part 16 and partially in the second housing part 18. By way of example, the differential transmission 14, for example, can be supplied with oil via or in the first oil chamber 100.

Furthermore, in FIG. 2, a second oil chamber is designated 102, which is arranged in each case partially in the second, third, fourth, and first housing parts 18, 20, 78 and 16. In or via the second oil chamber 102, for example, electric drive components for electrically driving the wheels can be supplied with oil. In particular, the first gear wheel 40, the second gear wheel 42, the first shaft 44, the first planetary set 46 are supplied with oil in the second chamber 102. Particularly advantageously, the second planetary set 56 is also supplied with oil in the second oil chamber 102. The second oil chamber 102 is sealed both from the outside and from the first oil chamber 100. For this purpose, an oil distribution device 104 of the axle drive 19 is provided, wherein the oil distribution device 104 is simply also referred to as an oil distributor. The axle drive 10 comprises, for example, an oil pump not depicted in the figures for conveying the oil. The oil distributor has a first oil connection 106, via which the oil distributor can be supplied with oil from the oil pump.

The oil distributor has a second oil connection 108 and a third oil connection 110, via which the second housing part 18 and in particular the electric motor 12 can be supplied with oil from the oil distributor. By way of example, an upper part and a lower part of the rotor of the electric motor 12 can be supplied with oil via the second oil connection 108. By way of example, an upper part and a lower part of the stator 34 can be supplied with oil via the third oil connection 110. For this purpose, for example, a first oil line 112 and a second oil line 114 are provided, wherein, for example, the second oil connection 108 is connected to the second housing part 18, in particular to the rotor, by means of the first oil line 112. Thus, the second housing part 18 or the parts of the rotor can be supplied with oil from the oil distributor via the first oil line 112. By means of the second oil line 114, the third oil connection 110 is connected to the second housing part 18 or to the stator 34, such that the second housing part 18 or the stator 34 or its parts can be supplied with oil from the third oil connection 110 or from the oil distributor via the second oil line 114. In this case, the first oil line 112 runs through the fourth housing part 78, for example. Alternatively, or additionally, the second oil line 114 bypasses the fourth housing part 78, for example.

In addition, the oil distributor has a fourth oil connection 116 via which, for example, the third housing part 20 or transmission elements of the sub-transmission 26 arranged in the third housing part 20 can be supplied with oil from the oil distributor. For this purpose, a third oil line 118 is provided, by means of which, for example, the fourth oil connection 116 and thus the oil distributor is connected to the third housing part 20 or to the transmission elements arranged in the third housing part 20. Thus, the third housing part 20 or the transmission elements of the sub-transmission 26 arranged in the third housing part 20 can be supplied with oil from the fourth oil connection 116 via the third oil line 118. Here, for example, the third oil line 118 runs through the second housing part 18.

The differential transmission 14 has, for example, a differential lock which can be activated and deactivated, for example. For this purpose, the axle drive 10 comprises an actuator 119, by means of which the differential lock can be actuated and thus activated and/or deactivated.

It can be seen particularly well from FIGS. 1, 6 and 7 that the electric axle drive 10 also has a bearing bracket 120 which is formed separately from the first, second, third, fourth, and fifth housing parts 16, 18, 20, 78 and 84 and on which the differential transmission 14 is mounted. The bearing bracket 120 is thereby partially, in particular at least predominantly or completely, arranged in the first housing part 16 and thereby held by means of a first holding device 122 on the second housing part 18 and by means of a second holding device 124 on the third housing part 20. Alternatively, or additionally, a third holding device not visible in the figures can be provided, by means of which the bearing bracket 120 is held on the first housing part 16. It can be seen from FIG. 7 that the third housing part 20 and the bearing bracket 120 as well as the second housing part 18 and the bearing bracket 120 define respective through openings 126 which are completely closed in respective peripheral directions and through which the side shafts 64 and 66 pass.

From FIG. 4, a first oil sump 128 and a second oil sump 130 can be seen, in which the oil can collect, for example. Here, the oil sump 128 is arranged in the third housing part 20, and the second oil sump 130 is provided in the fourth housing part 78. A suction line 132 is provided, via which the oil pump can suck out oil that has collected in the oil sumps 128 and 130 from the oil sumps 128 and 130 and thus convey it. In particular, it is preferably provided that the holding device 122 and 124, via which the bearing bracket 120 is connected to the second and third housing parts 18 and 20, are accommodated in the first housing part 16.

In synopsis with FIG. 3, it can be seen that the axle drive 10 has not only the electric motor 12 as a first electric motor, but at least or exactly one second electric motor. The previous and following explanations concerning the electric motor 12 can also be applied readily to the second electric motor. The sub-transmission 26, in particular the first spur gear stage 38, comprises a further fifth gear wheel 134, for example formed as a spur gear, which is spaced apart from the first gear wheel 40 and, like the first gear wheel 40, meshes with the second gear wheel 42. As a result, the second gear wheel 42 can be driven by the electric motor 12 via the first gear wheel 40 and by the second electric motor via the fifth gear wheel 134. Thus, the differential transmission 14 can also be driven electrically by the second electric motor via the sub-transmission 26. In particular, it is conceivable that the rotor of the electric motor 12 and the rotor of the second electric motor can be supplied with oil from the oil distributor via the first oil line 112 or via the second oil connection 108. Alternatively, or additionally, the stator 34 of the electric motor 12 and the stator of the second electric motor can be supplied with oil from the oil distributor via the second oil line 114 or via the third oil connection 110.

The aforementioned flange planes are parting planes in or along which the respective housing parts are assembled or connected to one another. It can be seen particularly well from FIG. 3 that the gears 42 and 54 overlap or penetrate the respective parting plane between the second housing part 18, which is also referred to as the intermediate housing, and the first housing part 16, which is designed as an axle bridge, for example, or the parting plane between the first housing part 16 and the third housing part 20, which is also referred to as the transmission housing.

Furthermore, it can be seen particularly well from FIG. 6 that, for example, the second and third housing parts 18 and 20 together with the bearing bracket 120 form a closed ring structure 136, which is also referred to as a flange ring or closed flange ring, for example. In this way, a particularly high rigidity of the axle drive 10 can also be ensured in a way that is favorable in terms of installation space.

The axle or axle drive 10 is preferably designed with classic withdrawable technology, wherein an insertion is formed, for example, by the second, third, fourth, and fifth interconnected housing parts 18, 20, 78 and 84 and the bearing bracket 120 connected to the second and third housing parts 18 and 20. This insertion is inserted into the first housing part 16 (axle bridge), in particular in such a way that the bearing bracket 120 and the second and third housing parts 18 and 20 are each arranged at least partially in the axle bridge. The insertion is screwed to the axle bridge, for example. For this purpose, for example, the intermediate housing and the transmission housing form respective parts of a connecting flange, by means of which the insertion is connected, in particular screwed, to the axle bridge. For this purpose, the connecting flange is screwed to the axle bridge, for example. Additional support of the insertion on the axle bridge is provided by the bearing bracket 120. The bearing bracket 120 is of closed design and establishes a connection between two bearing points of the differential transmission 14 and thus stiffens a composite of intermediate housing and transmission housing.

The respective housing parts can be made out of a metallic material, in particular aluminum, wherein the bearing bracket 120 can preferably be made of a material of higher strength than this, in particular steel. This can ensure particularly high rigidity or strength. The parting plane between the transmission housing and the intermediate housing extends into the axle bridge. This allows the sub-transmission 26 to use installation space within the axle bridge. The electric motors, for example, are positioned and guided in the radial direction via two fits on an outer diameter. An axial fastening is provided on the end face, for example via four bolts, and also serves to provide torque support. The two electric motors share a housing common to the electric motors, in particular in the form of the housing part 18.

It is also provided that the second planetary set 56 is arranged at least partially, in particular at least predominantly or completely, in the third housing part 20. By way of example, the first planetary set 46 is arranged partially in the second housing part 18 and partially in the third housing part 20. Furthermore, the planetary sets 46 and 56 are arranged next to each other along a direction running perpendicular to the motor axis of rotation 36 and perpendicular to the differential transmission axis of rotation 62, wherein they can be arranged, for example, without overlapping one another in the axial direction of the respective planetary set 46 or 56. The second planetary set 56 is arranged coaxially with the first shaft 44 or coaxially with the first gear wheel 40. The second planetary set 56 is arranged coaxially with the second shaft 48 or coaxially with the second gear wheel 42.

The intermediate housing serves in particular to accommodate the electric motors, including their cooling jackets. In addition, the housing accommodates, for example, a switching actuator, which can comprise at least one pneumatic valve with ducts, at least one switching cylinder and/or at least one piston rod. In addition, the intermediate housing accommodates at least one connecting line between the respective oil sump 128 or 130 and a suction connection, an oil pump, oil ducts such as, for example, at least parts of the oil lines 112 and 114, parts of the first and third shafts 44 and 58, and the second and fourth bearing points 68 and 70 for supporting the third shaft 58 or the third gear wheel 52. The respective bearing point can thereby comprise at least one bearing element, in particular a roller bearing. In addition, the actuator 119 for operating the differential lock is accommodated in the intermediate housing, for example. Furthermore, it is preferably provided that the intermediate housing has receptacles in which the respective electric motors are at least partially, in particular at least predominantly or completely, accommodated. In addition, pneumatic lines run in the intermediate housing, for example. The transmission housing preferably serves to accommodate oil ducts and the first oil sump 128. Furthermore, at least respective parts of the first and second shafts 44 and 48 are accommodated in the transmission housing. In addition, the transmission housing (third housing part 20) has first and third bearing points 28 and 30 for supporting the first and second shafts 44 and 48.

The motor cover serves to accommodate a high-voltage connection via which, for example, the power electronics or the electric motor 12 can be supplied with electric energy. In addition, the motor cover serves to accommodate oil ducts and, for example, the second oil sump 130. The bearing bracket 120 serves to support or accommodate the differential transmission 14 and provides additional support on the axle bridge. The bearing bracket also serves to stiffen the first and second housing parts 16 and 18. Preferably, the bearing bracket 120 is formed from grey cast iron.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the inven-

REFERENCE NUMERAL LIST 10 electric axle drive
12 electric motor
14 differential transmission
16 first housing part
18 second housing part
20 third housing part
22 first flange connection
24 third flange connection
26 sub-transmission
28 first bearing point
30 third bearing point
32 second flange connection
34 stator
36 motor axis of rotation
38 first spur gear stage
40 first gear wheel
42 second gear wheel
44 first shaft
46 first planetary set
48 second shaft
50 second spur gear stage
52 third gear wheel
54 fourth gear wheel
56 second planetary set
68 third shaft
60 differential housing
62 differential transmission axis of rotation
64 side shaft
66 side shaft
68 second bearing point
70 fourth bearing point
72 first flange plane
74 second flange plane
76 third flange plane
78 fourth housing part
80 fourth flange connection
82 side
84 fifth housing part
86 fifth flange connection
88 sixth flange connection
90 fourth flange plane
92 fifth flange plane
94 sixth flange plane
96 holder
98 high-voltage connection
100 first oil chamber
102 second oil chamber
104 oil distribution device
106 first oil connection
108 second oil connection
110 third oil connection
112 first oil line
114 second oil line
116 fourth oil connection
118 third oil line
119 actuator
120 bearing bracket
122 first holding device
124 second holding device
126 through opening
128 first oil sump
130 second oil sump
132 suction line
134 fifth gear wheel
136 ring structure

The invention claimed is:

1. An electric axle drive for a motor vehicle, the electric axle drive comprising:
an electric motor;
a differential transmission drivable by the electric motor;
a first housing part that at least partially surrounds the differential transmission;
a second housing part formed separately from the first housing part and at least partially surrounding the electric motor;
a third housing part formed separately from the first and second housing parts; and
a bearing bracket configured to mount the differential transmission, wherein the bearing bracket is arranged at least predominantly in the first housing part, is held by a first holding device on the second housing part, and is held by a second holding device on the third housing part,
wherein the first and second housing parts are directly connected to each other by a first flange connection,
wherein the second and third housing parts are directly connected to each other by a third flange connection,
wherein the third housing part is configured to at least partially support a sub-transmission connecting the differential transmission to the electric motor, and
wherein the first and third housing parts are directly connected to each other by a second flange connection.

2. The electric axle drive of claim 1, wherein the third housing part has at least one first bearing point to support a first shaft of the sub-transmission.

3. The electric axle drive of claim 1, wherein the third housing part has at least one third bearing point to support the sub-transmission.

4. The electric axle drive of claim 1, further comprising:
a fourth housing part formed separately from the first, second, and third housing parts, wherein the fourth housing part is directly connected to the second housing part by a fourth flange connection and is arranged on a side of the second housing part facing away from the third housing part, wherein the fourth housing part is configured to cover an access opening for the electric motor formed in the second housing part.

5. The electric axle drive of claim 4, further comprising:
a fifth housing part formed separately from the first, second, and third housing parts, wherein the fifth housing part is directly connected to the second housing part by a fifth flange connection and is directly connected to the fourth housing part by a sixth flange connection, and wherein the fifth housing part has a holder for at least one high-voltage connection.

6. The electric axle drive of claim 5, wherein the fifth flange connection and the sixth flange connection have a fifth flange plane common to the fifth flange connection and the sixth flange connection.

7. The electric axle drive of claim 4, further comprising:
an oil distribution device having a second oil connection, a third oil connection, a first oil line and a second oil line.

8. The electric axle drive of claim 7, wherein the second oil connection is connected to the second housing part by the first oil line, and wherein the third oil connection is connected to the fourth housing part by the second oil line.

9. The electric axle drive of claim 7, wherein the second oil connection is connected to the first housing part by the first oil line, and wherein the third oil connection is connected to the third housing part by the second oil line.

10. The electric axle drive of claim 1, wherein the second housing part has at least one second bearing point configured to support for supporting a spur gear stage of the sub-transmission.

11. The electric axle drive of claim 1, wherein the first flange connection forms a first ring section and the second flange connection forms a second ring section, wherein the first and second ring sections form a closed flange ring.

12. The electric axle drive of claim 11, wherein the third flange connection forms a third ring section having a first section end and a second section end, and wherein both the first section end and the second section end are connected to the closed flange ring.

13. The electric axle drive of claim 1, wherein the electric motor has a stator and a rotor, which can be rotated around a motor axis of rotation relative to the stator, wherein the differential transmission has output gears that are rotatable around a differential transmission axis of rotation relative to the first housing part, and wherein the motor axis of rotation runs in parallel to the differential transmission axis of rotation.

14. The electric axle drive of claim 1, wherein the second housing part has at least one first receptacle for the electric motor and at least one second receptacle for a second electric motor.

15. The electric axle drive of claim 1, further comprising:
a first oil chamber, wherein the first oil chamber is arranged predominantly in the first housing part; and
a second oil chamber sealed against the first oil chamber, wherein the second oil chamber is arranged at least partially in each of the second, third, and fourth housing parts, and wherein oil is supplied to a first gear wheel, a second gear wheel, and the first shaft in the second oil chamber.

\* \* \* \* \*